United States Patent [19]

Paulson

[11] Patent Number: 4,976,940

[45] Date of Patent: Dec. 11, 1990

[54] METHOD FOR PRODUCING H2 USING A ROTATING DRUM REACTOR WITH A PULSE JET HEAT SOURCE

[75] Inventor: Leland E. Paulson, Morgantown, W. Va.

[73] Assignee: The United States of America as represented by the Department of Energy, Washington, D.C.

[21] Appl. No.: 388,714

[22] Filed: Aug. 2, 1989

Related U.S. Application Data

[63] Continuation of Ser. No. 193,704, May 13, 1988, abandoned.

[51] Int. Cl.$^5$ .............................................. C01B 3/02
[52] U.S. Cl. ................................................. 423/648.1
[58] Field of Search ..................... 423/648.1, 650, 651, 423/653, 654, 415 A, DIG. 11, 437; 431/1; 422/209; 252/373

[56] References Cited

U.S. PATENT DOCUMENTS 2,703,275  3/1955  Elliott et al. .................... 423/650
3,976,747  8/1976  Shale et al. ...................... 423/244 A

OTHER PUBLICATIONS

Riegel, Emil R., "Industrial Chemistry", 5th Ed., pp. 298-299, 302-303, (Reinhold Publishing Corporation).

Kinetics of Catalyzed Steam Gasification of Low Rank Coals to Produce Hydrogen, Galegher, Timpe, Willson and Farnum, report under cooperative agreement No. DE-FC-83FF60181, Apr. 11, 1986.

Adapting a Pulse Jet Combustion System to Entrained Drying of Lignite, Ellman, Belter and Dockter, U.S. Bureau of Mines, 5th International Coal Preparation Congress, Oct. 1966.

Coal Burns Best in Pipes that Hum, Science News, Ralaff, vol. 125, p. 278, May 5, 1984.

Primary Examiner—Melvyn J. Andrews
Attorney, Agent, or Firm—David E. Breeden; Stephen D. Hamel; William R. Moser

[57] ABSTRACT

A method of producing hydrogen by an endothermic steam-carbon reaction using a rotating drum reactor and a pulse jet combustor. The pulse jet combustor uses coal dust as a fuel to provide reaction temperatures of 1300° to 1400° F. Low-rank coal, water, limestone and catalyst are fed into the drum reactor where they are heated, tumbled and reacted. Part of the reaction product from the rotating drum reactor is hydrogen which can be utilized in suitable devices.

7 Claims, 1 Drawing Sheet

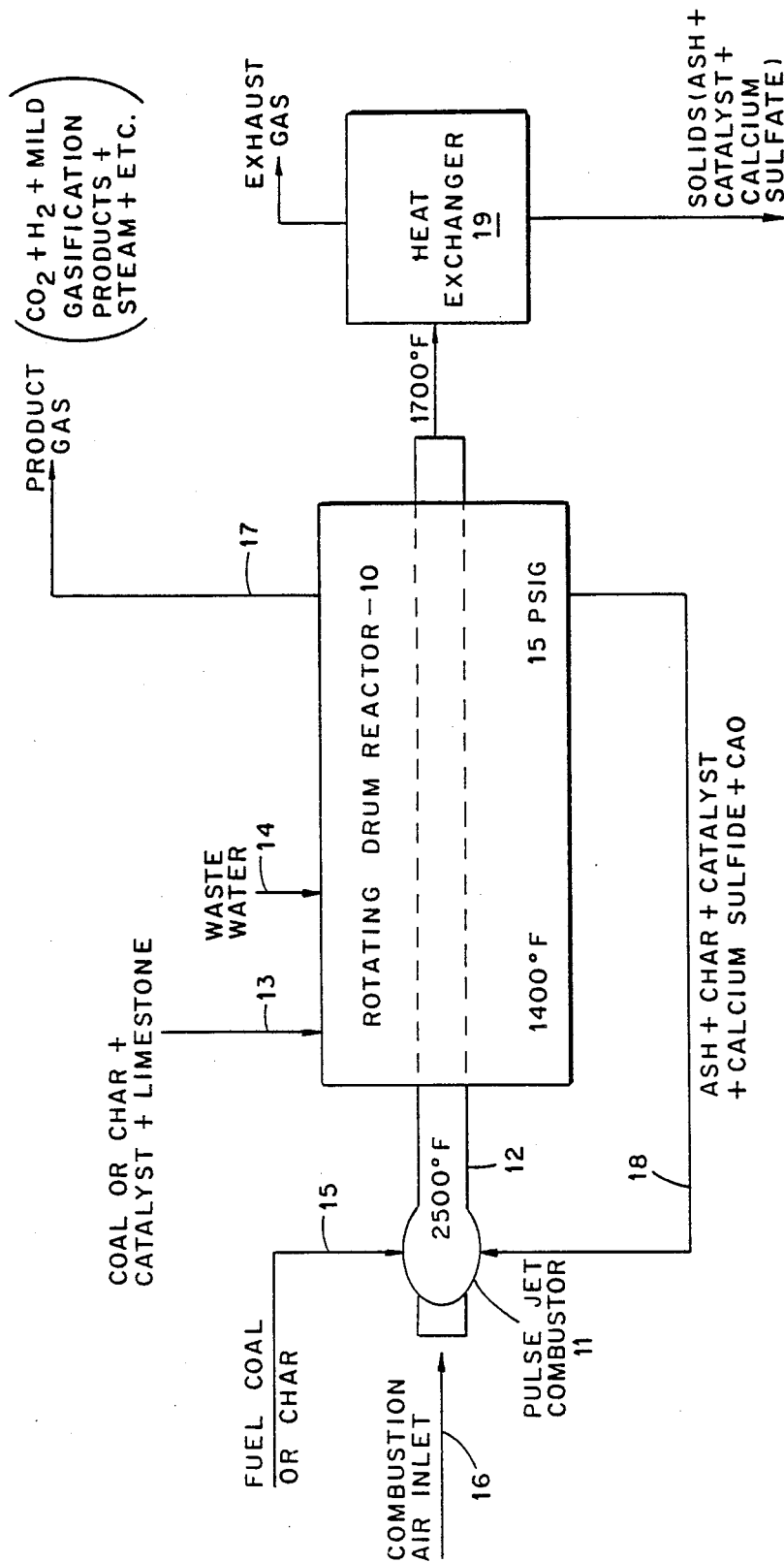

METHOD FOR PRODUCING H2 USING A ROTATING DRUM REACTOR WITH A PULSE JET HEAT SOURCE

This is a continuation of application Ser. No. 07/193,704 filed May 13, 1988 now abandoned.

BACKGROUND OF THE INVENTION

The present invention relates to a method of producing hydrogen and more particularly to a method of producing hydrogen by an endothermic steam-carbon reaction to produce hydrogen using an indirectly heated, rotating drum reactor.

DESCRIPTION OF THE PRIOR ART

It is known in the prior art to pyrolize a low-rank coal or char in the presence of a catalyst and steam to produce hydrogen. Lignites and subbituminous coals have a higher inherent reactivity compared to coals of higher rank and therefore, they are probable choices for use in steam gasification for hydrogen production. Low temperature chars prepared from all grades of coal and other carbonaceous materials such as peat or biomass have also been used for hydrogen production by pyrolysis. The use of char offers several advantages over coal in such hydrogen production due to properties in char different from those in coal. For example, low moisture content in char minimizes energy additions to the process for drying purposes. Further, char, which is more reactive than coal, can be introduced into a reactor at or near the temperature utilized for hydrogen production so as to minimize feed heat-up requirements.

Catalysts found useful in the production of hydrogen include calcium compounds (limestone), $K_2CO_3$, $Na_2CO_3$, trona, nahcolite, sunflower hull ash, and lignite ash. Catalysts of this type are naturally-occurring and are inexpensive so that their use as gasification catalysts may result in the elimination of the need for catalyst recovery in the hydrogen-from-coal process, thereby simplifying operation and improving process economics. Further, the use of calcium compounds, such as limestone, as the catalyst or together with any of the other catalysts is advantageous since the calcium compounds react with sulfur in the coal to remove a significant percentage of the sulfur from the gaseous product stream.

In the generation or production of hydrogen from a carbonaceous feed such as char of coal, the feed material is heated to a temperature in the range of about 1200°–1400° F. in the presence of steam and a catalyst such as described above to effect the pyrolysis of the feed to provide liquid, gaseous and solid products. The gaseous products include hydrogen, carbon monoxide, carbon dioxide, hydrocarbons (methane), water vapor, and sulfur compounds. The relative yield of the liquid and gaseous pyrolysis products depends on several factors such as reactivity of the feed, catalyst activity, reaction temperature, reaction time, etc.

Various techniques and mechanisms have been previously utilized to provide for the heating of the reactants to the temperature required for the pyrolysis reaction and include reactors such as vertical retorts, horizontal retorts, and fluidized or entrained type retorts. Details of various pyrolysis reactions and pyrolysis reactors as known in the art are set forth in the reports entitled "Kinetics of Catalyzed Steam Gasification of Low-Rank Coals to Produce Hydrogen" by Galegher, Timpe, Willson and Farnum, April 1986, DOE Final Report under contract number DE-FC21-83FE60181, available from National Technical Information Service (NTIS), and in the report entitled "Low-Rank Coal Study—National Needs for Resource Development", volume 3—Technology Evaluation, November 1980, by Energy Resources Co., Inc., Walnut Creek, Calif. under DOE contract number DE-AC18-79FC10066.

SUMMARY OF THE INVENTION

Accordingly, one object of the present invention is to provide an improved method for producing hydrogen by an endothermic steam-carbon reaction in a rotating drum reactor.

It is another object of the present invention to use a pulse-jet combustor as a source of heat to a rotating drum reactor for producing hydrogen.

According to another aspect of the present invention, a method is provided for producing hydrogen by an endothermic steam-carbon reaction comprising a series of steps using a rotating drum reactor. The method includes rotating a drum reactor about an axis and providing the rotating reactor with an internal source of heat from the tailpipe of a pulse jet combustor, the tailpipe extending along the axis of rotation of the drum reactor and being surrounded by the reactor. According to the invention, coal dust fuel is fed to the pulse jet combustor to heat the tailpipe to a temperature greater than 1400° F. to assure the presence of a temperature distribution of a about 1200° F.-to-1400° F. throughout the rotating drum reactor. Char or low-rank coal, water, limestone and a suitable catalyst is fed into the drum reactor where they are heated, tumbled and reacted. After reaction, hydrogen is withdrawn as part of the reaction product from the drum reactor.

According to another aspect of the present invention, we treat the reaction product from said drum reactor to separate water, organics and other contaminates from the hydrogen.

According to still another aspect of the present invention, we use the water separated from the reaction product may be recycled into the drum reactor along with the other materials fed to the reactor.

According to still a further aspect of the present invention, we use excess heat from the tailpipe of the pulse jet combustor may be used to heat the hydrogen which is separated from the product prior to use of the hydrogen in a fuel cell or other appropriate device.

According to other aspects of the present invention, the catalyst used in performing the method is selected from one or more simple inexpensive catalysts such as $Na_2CO_3$, $K_2CO_3$, trona, nahcolite and a calcium compound such as limestone or dolomite.

As compared to conventional gasification systems, the present invention has the advantage that it eliminates steam, oxygen and waste water treatment plants. Also, the present method is relatively simple and inexpensive.

It should be understood that other objects and advantages of the present invention will be readily appreciated by reference to the following detailed description when considered in connection with the accompanying drawing.

DESCRIPTION OF THE DRAWING

The single FIGURE of drawing is a schematic showing one embodiment of the present invention wherein a rotating drum reactor is heated by use of a pulse jet.

DESCRIPTION OF THE PREFERRED EMBODIMENT

The drawing graphically depicts one embodiment of a method according to the present invention wherein a rotating drum reactor 10 is heated by a pulse jet combustor 11. The pulse jet is fired by any suitable fuel or combination of fuels such as crushed coal, oil, liquid carbonaceous products and char from the drum reactor, etc. As illustrated in the drawing, the tailpipe 12 of the pulse jet combustor 11 is located at the center axis of the rotating drum reactor. In operation, the drum reactor 10 rotates around the tailpipe 12, the external surface of which acts as a heat exchanger. Thus, during rotation of the drum reactor 10, the reactant contents are heated, tumbled, mixed and reacted as described in more detail below.

As represented by arrow 13, the feed to the rotating drum reactor 10 is crushed "as-mined" low-rank coal, low temperature char, or a biomass, and a disposable catalyst. The disposable catalyst may be potassium carbonate ($Na_2CO_3$) naturally occurring alkali mineral such as trona and nahcolite (both containing substantial elemental sodium), limestone, dolomite, and/or other similar catalysts. Limestone or other calcium compound is preferably used alone or together with the other catalysts for the removal of sulfur from the gaseous product stream. As depicted by arrow 14, water is also fed to the rotating drum reactor.

As indicated by arrow 15, the pulse jet combustor 11 is fueled with coal dust and air as indicated by arrow 16.

By carrying out the method of the disclosed embodiment, the product case indicated by arrow 17 from the rotating drum reactor 10 would contain mostly hydrogen (60+%), carbon dioxide (30+%), mild gasification products, and water. Preferably, the water, organics, and other contaminants in the product gas would be separated from the product gas stream before the hydrogen is utilized in a fuel cell or appropriate utilization device. After condensation, the water separated from the product gas can be returned to the rotating drum reactor 10 as indicated by arrow 14 which depicts the introduction of water. This would eliminate water treatment requirements.

As indicated by arrow 18 of the drawing, some of the by-products of the reaction in the rotating drum reactor can be fed back to the pulse jet combustor 11. Typically, the by-products would be ash, liquid hydrocarbons, char, catalyst, calcium sulfide and CAO. As indicated on the drawing, the right end of the tailpipe of pulse jet combustor 11 extends completely through the rotating drum reactor. The waste products issuing at the end of the tail pipe 12 may be used in conjunction with a heat exchanger 19. According to one embodiment, the hydrogen separated from the product gas can be fed through the heat exchanger 19 to heat the hydrogen to meet the appropriate requirements of the end use application of the hydrogen.

As indicated by the above description, laboratory studies and thermodynamic calculations have shown that a catalytic gasification method using low-rank coal should operate at atmospheric pressure and 1300° to 1400° F. to maximize hydrogen concentration in the product gas stream. These conditions are obtainable with the method and apparatus according to the described embodiment of the present invention.

It should be apparent to those skilled in the art that the method according to the present invention eliminates equipment used in conventional gasification systems and greatly simplifies and reduces the expense of coal gasification. Thus, according to the present method, the need for a steam plant, oxygen plant and waste water treatment plant are eliminated. Moreover, according to the present invention a simplified gas clean-up system is available. Furthermore, the preparation of the coal fuel is simplified in that all that is necessary is a crushing operation. The use of the described catalyst results in inexpensive operation since the catalyst is readily available and is disposable.

While a preferred embodiment of the present invention has been illustrated and described, it will be apparent to those skilled in the art that modifications can be made within the scope of the invention which is defined in the appended claims. Accordingly, the foregoing embodiment is to be considered illustrative only, rather than restricting the invention and those modifications which come within the meaning and range of equivalency of the claims are to be included herein.

What is claimed is:

1. A method of producing hydrogen by an endothermic steam-carbon reaction comprising the steps of:
    rotating an annular drum reactor about an axis;
    heating said reactor by a source of heat disposed at a location external to said reactor and generated along said axis at a location radially inwardly from the drum reactor and provided by an external surface of a tailpipe of a pulse jet combustor longitudinally extending along said axis and circumferentially surrounded by said rotating drum reactor;
    feeding a fuel including coal dust to the pulse jet combustor to heat the tailpipe for effecting the heating of the rotating drum reactor disposed radially outwardly from the external surface said tailpipe to a temperature of 1200° to 1400° F.;
    feeding char or low-rank coal, water, and a catalyst into said rotating drum reactor where they are heated by the source of heat external to the reactor, tumbled and endothermically reacted to form gaseous reaction products; and
    withdrawing hydrogen as part of the reaction products from said reactor.

2. The method for producing hydrogen by an endothermic steam-carbon reaction as claimed in claim 1, wherein said catalyst comprises $Na_2CO_3$.

3. The method for producing hydrogen by an endothermic steam-carbon reaction as claimed in claim 1, wherein said catalyst comprises trona.

4. The method for producing hydrogen by an endothermic steam-carbon reaction as claimed in claim 1, wherein said catalyst comprises $NaHCO_3$.

5. The method for producing hydrogen by an endothermic steam-carbon reaction as claimed in claim 1, wherein said catalyst comprises $K_2CO_3$.

6. The method for producing hydrogen by a steam-carbon reaction as claimed in claim 1, wherein the gaseous reaction products comprise at least about 60 percent steam, about 30 percent carbon dioxide and the balance water and mild gasification products.

7. The method for producing hydrogen by an endothermic steam-carbon reaction as claimed in claim 1, wherein said fuel includes byproducts from the reaction in said drum reactor.

* * * * *